US012490853B1

(12) United States Patent
He

(10) Patent No.: US 12,490,853 B1
(45) Date of Patent: Dec. 9, 2025

(54) COMBINED FABRIC CURTAIN WITH INTERACTIVE DISPLAY

(71) Applicant: SHANGYOU JIAYI LIGHTING PRODUCT CO., LTD., Shangyou (CN)

(72) Inventor: Yaowen He, Shangyou (CN)

(73) Assignee: SHANGYOU JIAYI LIGHTING PRODUCT CO., LTD., Shangyou (CN)

( * ) Notice: Subject to any disclaimer, the term of this patent is extended or adjusted under 35 U.S.C. 154(b) by 0 days.

(21) Appl. No.: 19/072,781

(22) Filed: Mar. 6, 2025

(30) Foreign Application Priority Data

Jan. 8, 2025 (CN) ........................ 202520041811.X

(51) Int. Cl.
*A47H 23/00* (2006.01)
*A47H 23/08* (2006.01)
*F21V 33/00* (2006.01)
*E06B 9/24* (2006.01)

(52) U.S. Cl.
CPC ............. *A47H 23/00* (2013.01); *A47H 23/08* (2013.01); *F21V 33/0016* (2013.01); *A47H 2023/006* (2013.01); *E06B 2009/247* (2013.01)

(58) Field of Classification Search
CPC ........ A47H 2023/006; A47H 2023/003; E06B 2009/247; E06B 2009/6809; F21Y 2105/10; F21Y 2107/70; F21S 4/15; F21V 33/0016
See application file for complete search history.

(56) References Cited

U.S. PATENT DOCUMENTS

| | | | | | |
|---|---|---|---|---|---|
| 5,066,085 | A * | 11/1991 | Gimbutas | F21V 33/0004 385/115 |
| 5,359,735 | A * | 11/1994 | Stockwell | D06M 15/643 2/243.1 |
| 6,497,934 | B1 * | 12/2002 | Mahn, Jr. | B29C 66/112 428/57 |
| 7,374,315 | B2 * | 5/2008 | Dorsey | F21S 43/14 362/800 |
| 9,482,393 | B2 * | 11/2016 | Shirilla | F21S 2/005 |
| 9,803,843 | B2 * | 10/2017 | Engelen | E04F 10/06 |
| 11,226,089 | B1 * | 1/2022 | McRae | F21V 23/0435 |
| 11,415,308 | B1 * | 8/2022 | Haney | F21V 33/006 |
| 2005/0237741 | A1 * | 10/2005 | Chang | E06B 9/262 362/249.01 |

(Continued)

*Primary Examiner* — Abe Massad
(74) *Attorney, Agent, or Firm* — AVEK IP, LLC

(57) ABSTRACT

Some embodiments of the disclosure relate to the technical field of circuits and disclose a combined fabric curtain with interactive display, including a curtain body and further including a control system and a plurality of flexible LED light strips. The curtain body includes a first fabric base layer and a second fabric covering layer; the control system controls the plurality of flexible LED light strips to interact and cooperate with each other to emit light to form preset patterns. The present disclosure may improve the structure of a conventional curtain and combine the conventional curtain with the flexible LED light strips to form the combined curtain with interactive display. As a result, the function of the curtain is no longer limited to sunshade and heat insulation, and the curtain may also have a decorative function and may form preset patterns by controlling the light strips as needed.

9 Claims, 5 Drawing Sheets

(56) References Cited

U.S. PATENT DOCUMENTS

| | | | | |
|---|---|---|---|---|
| 2010/0134025 | A1* | 6/2010 | Link | H05B 45/20<br>315/185 R |
| 2016/0252231 | A1* | 9/2016 | Fujikawa | F21V 19/005<br>362/235 |
| 2018/0035837 | A1* | 2/2018 | Scribner | A47H 21/00 |
| 2024/0102637 | A1* | 3/2024 | He | F21S 4/28 |

* cited by examiner

COMBINED FABRIC CURTAIN WITH INTERACTIVE DISPLAY

BACKGROUND

1. Technical Field

The present disclosure relates to the technical field of curtains and, in particular, to a combined fabric curtain with interactive display.

2. Description of Related Art

Curtains are household goods. Most conventional curtains are made of cloth, linen, yarn, aluminum sheets, wood chips, metal materials, etc. The control methods of curtains are divided into manual and electric methods. The curtains are mainly used for sunshade, heat insulation and indoor light adjustment. However, as people's requirements for quality of life are improving continuously, the functional requirements for curtains are becoming increasingly diversified. People's demand for curtains is no longer just simple sunshade and heat insulation or simple space embellishment. Conventional curtains available on the market no longer meet the needs of consumers. For this reason, the inventors make further improvements to the conventional curtains and provide a combined fabric curtain with interactive display.

SUMMARY

In view of the shortcomings of the prior art, the goal of the present disclosure is to provide a combined fabric curtain with interactive display, which has the characteristic of realizing interactive display patterns.

In order to achieve the above goal, the present disclosure provides a combined fabric curtain with interactive display, including a curtain body and further including a control system and a plurality of flexible LED light strips. The curtain body includes a first fabric base layer and a second fabric covering layer, the first fabric base layer and the second fabric covering layer are both made of light-transmitting fabrics, the first fabric base layer and the second fabric covering layer overlap each other, and the first fabric base layer and the second fabric covering layer are spaced apart to form limiting passages for receiving the flexible LED light strips. The flexible LED light strips are fixedly installed in the limiting passages and are electrically connected to the control system. The control system controls the plurality of flexible LED light strips to interact and cooperate with each other to emit light to form preset patterns.

Optionally, a mounting portion is also provided at the top of the curtain body; the mounting portion is provided with a main telecommunication line, each of the flexible LED light strips has an end electrically connected to the main telecommunication line, and the main telecommunication line is electrically connected to the control system.

Optionally, an outer end of the mounting portion is also connected to a fold-over portion covering the main telecommunication line, and the mounting portion and the fold-over portion are both made of non-transparent materials.

Optionally, a Velcro is provided at an end of the fold-over portion, and the mounting portion is provided with a fastening tape used in combination with the Velcro.

Optionally, the combined fabric curtain with interactive display further includes a plurality of transverse structural lines which connect the plurality of flexible LED light strips, and the transverse structural lines and the flexible LED light strips are perpendicular to each other.

Optionally, the transverse structural lines are hot melt adhesive lines.

Optionally, the control system includes a circuit board, the circuit board is electrically connected to the main telecommunication line, and the circuit board is electrically connected to an electrical connector.

Optionally, the circuit board is provided with an electrical slot for placing a memory card.

Optionally, the first fabric base layer is also provided with a first fold-over edge, a second fold-over edge and a third fold-over edge; each of the flexible LED light strips includes a light strip body and a plurality of LED lamp beads arranged at intervals on the light strip body.

Optionally, the LED lamp beads are positioned in the limiting passages by dispensing glue.

Some embodiments of the disclosure may have one or more of the following effects. The present disclosure provides a combined fabric curtain with interactive display, including a curtain body and further including a control system and a plurality of flexible LED light strips. The curtain body includes a first fabric base layer and a second fabric covering layer, and the first fabric base layer and the second fabric covering layer are spaced apart to form limiting passages for receiving the flexible LED light strips. Compared with the prior art, the present disclosure may improve the structure of a conventional curtain and may combine the conventional curtain with the flexible LED light strips to form the combined curtain with interactive display. The combined fabric curtain with interactive display may be used indoors at home, and the light strips may be adjusted as needed to form preset patterns to enhance user experience make a great fun. The combined fabric curtain with interactive display may also be widely used in outdoors, camping, and other places. \

Figure 1:
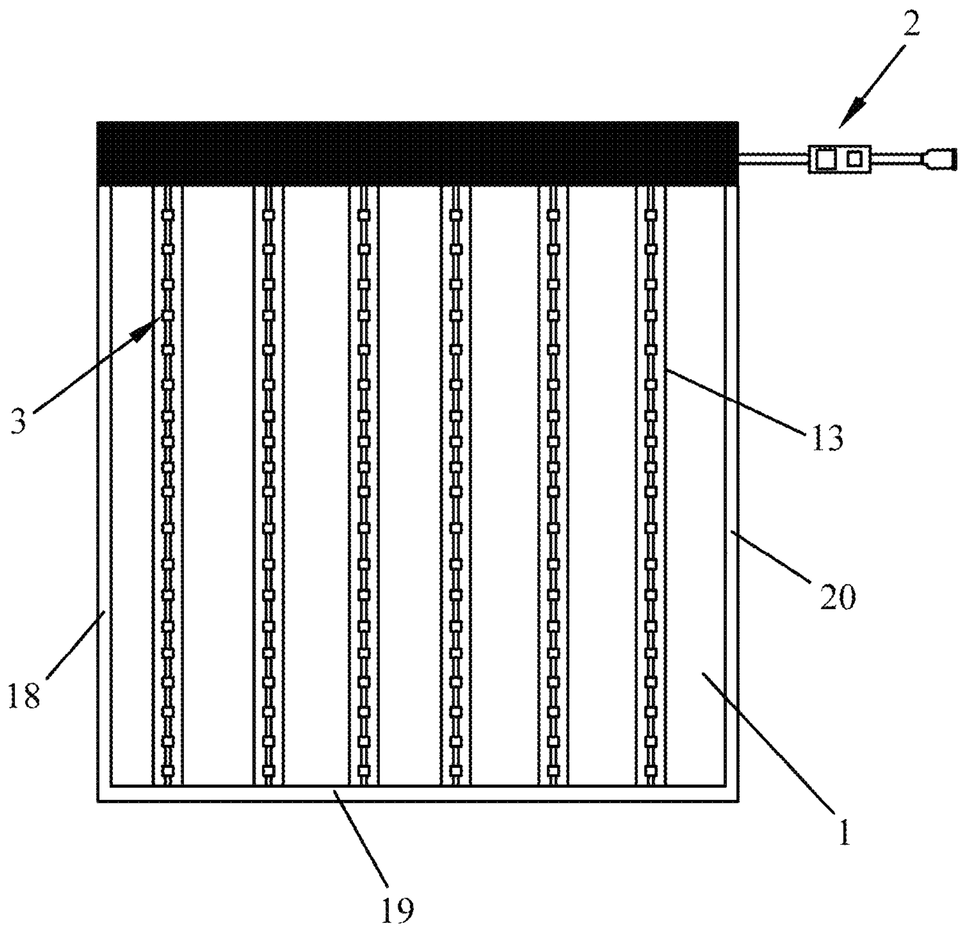
FIG. 1 is an overall schematic structural diagram of the present disclosure.
Figure 2:
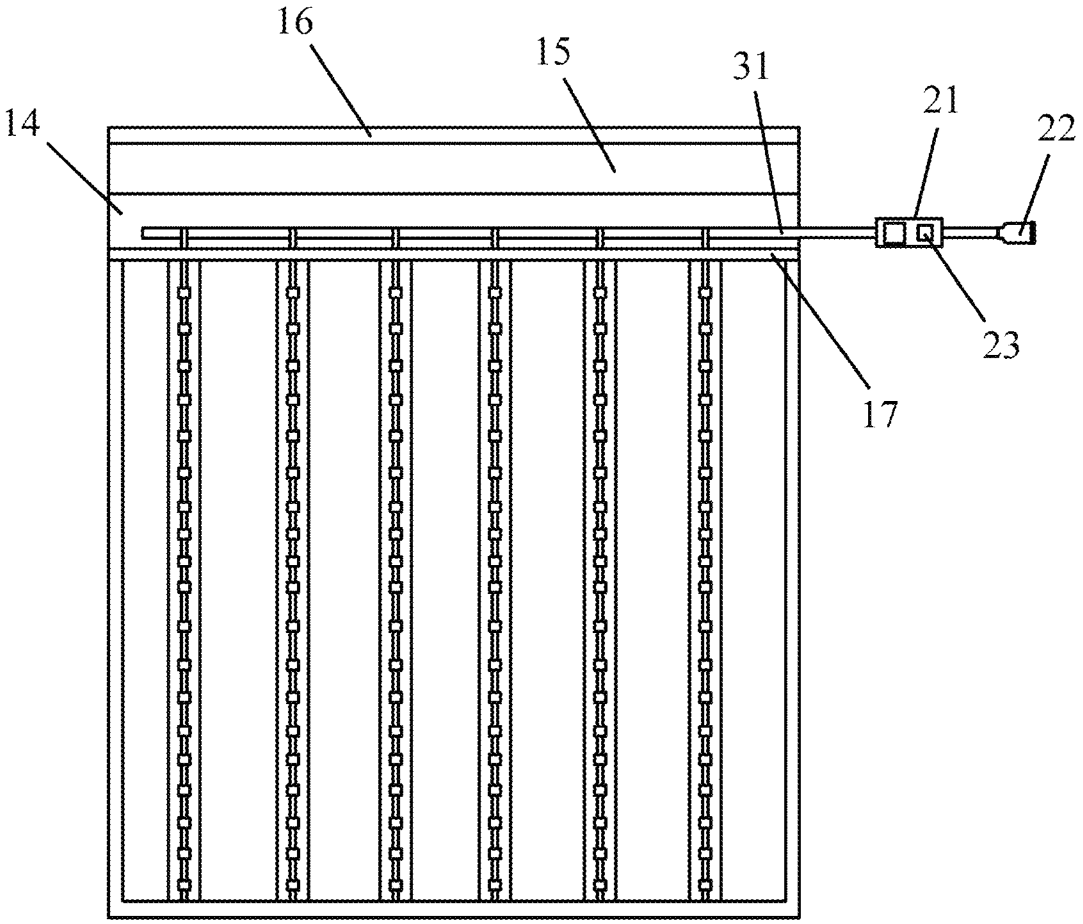
FIG. 2 is a schematic structural diagram of a control system structure of the present disclosure.
Figure 3:
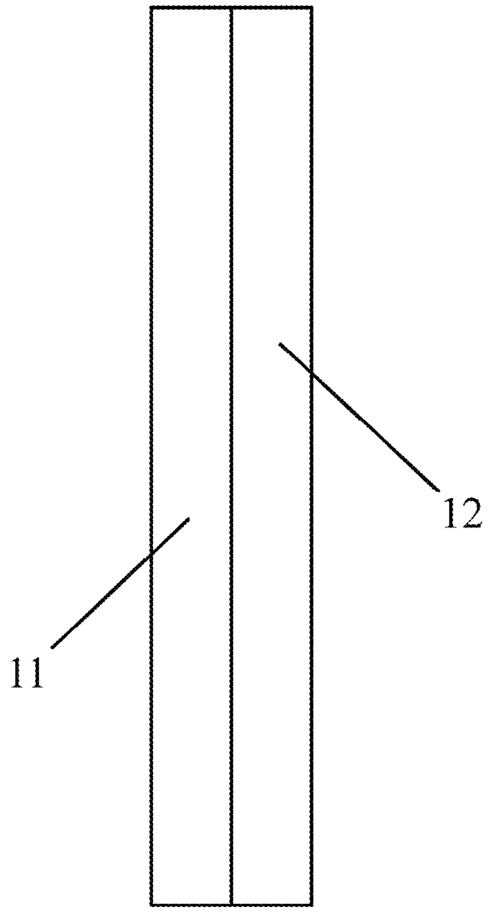
FIG. 3 is a schematic structural diagram of a curtain body of the present disclosure.

REFERENCE NUMERALS curtain body—1, first fabric base layer—11, second fabric covering layer—12, limiting passage—13, mounting portion—14, fold-over portion—15, Velcro—16, fastening tape—17, first fold-over edge—18, second fold-over edge—19, third fold-over edge—20, control system—2, circuit board—21, electrical connector—22, electrical slot—23, flexible LED light strip—3, main telecommunication line—31, light strip body—32, LED lamp beads—33, transverse structural line—4, sleeve—5, and guide rope—6.

DETAILED DESCRIPTION

The present disclosure is described in detail below in conjunction with FIGS. 1-4.

The present disclosure provides a combined fabric curtain with interactive display, including a curtain body 1 and further including a control system 2 and a plurality of flexible LED light strips 3. The curtain body 1 may include a first fabric base layer 11 and a second fabric covering layer 12. The first fabric base layer 11 and the second fabric covering layer 12 are both made of light-transmitting fabrics. The first fabric base layer 11 and the second fabric covering layer 12 overlap each other. The first fabric base layer 11 and the second fabric covering layer 12 are spaced apart to form limiting passages 13 for receiving the flexible LED light strips 3. The flexible LED light strips 3 are fixedly installed in the limiting passages 13 and are electrically connected to the control system 2. When a power supply is turned on, the control system 2 controls the plurality of flexible LED light strips 3 to interact and cooperate with each other to emit light to form preset patterns. For example: the control system 2 is usually connected to a mobile phone App or directly plays preset patterns in a memory card, thereby making the fabric curtain very interesting. The combined fabric curtain with interactive display may be widely used indoors at home, and may also be used in outdoor, camping and other scenarios to form decorations that may display different variable patterns.

The described translucent fabrics may also be equivalently replaced with mesh directly and are not limited to cotton or chemical fiber fabrics. In order to ensure good translucency, experiments show that light-transmitting fabrics with 65 meshes to 115 meshes that are tested by the Taylor International Standard Sieve are preferred. If the first fabric base layer 11 serves as a bottom layer, a 65-mesh fabric with low light transmittance may be selected, while the second fabric covering layer 12 may use a 100-mesh base material or a base material with a larger mesh. In this way, for the combined fabric curtain having a front side and a back side, it may be ensured that the light transmittance of the front side is better than that of the back side. In view of this, the flexible LED light strips 3 may be limited and fixed. Moreover, light of LEDs may be scattered out through different holes, reducing direct light and achieving soft light.

Figure 5:
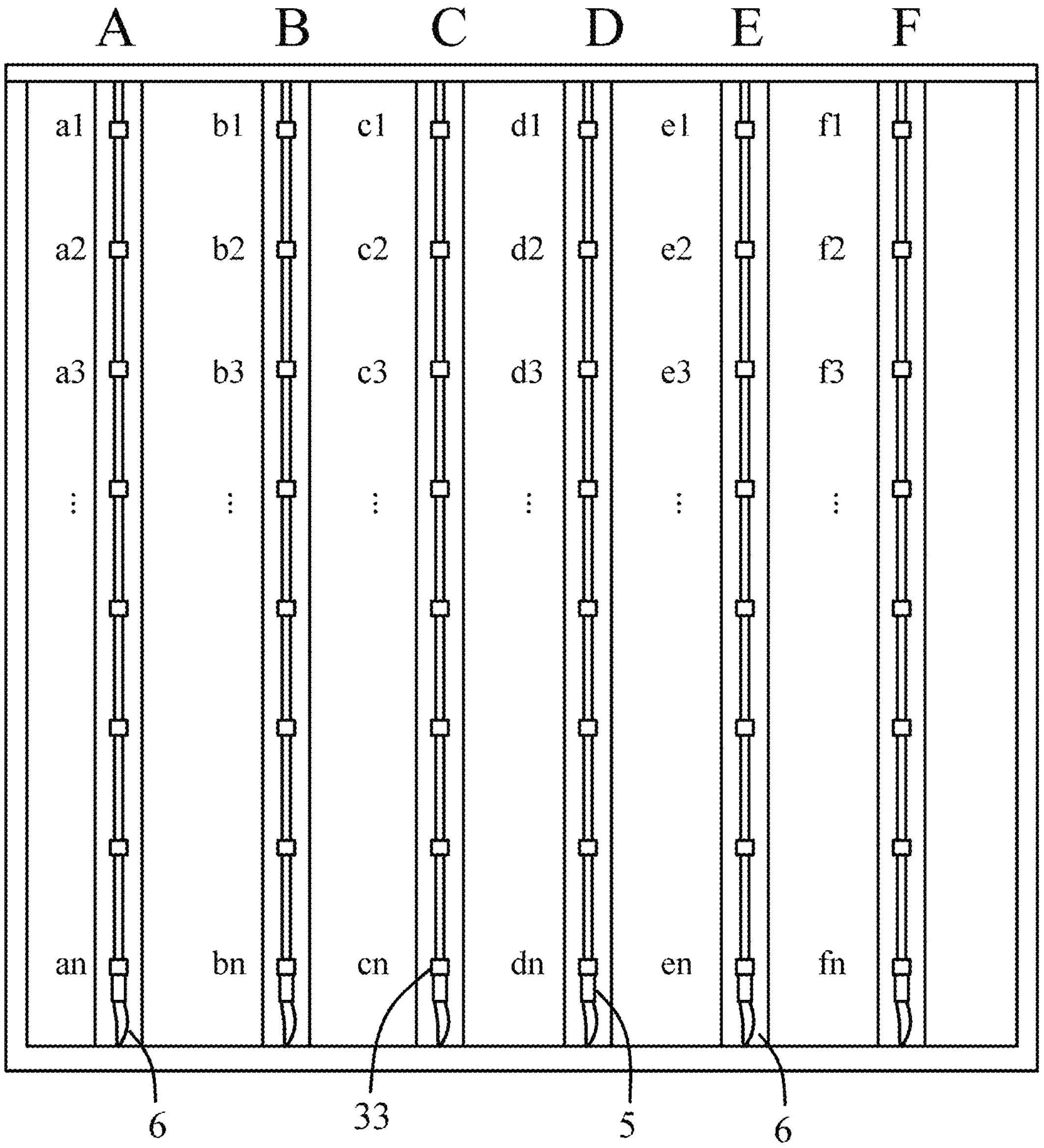
FIG. 5 shows an embodiment using LED lamp beads with addresses.

Referring to FIG. 5, in order to further realize the display of a preset pattern (such as a heart shape, a balloon, an animal, a letter pattern, etc.), in this embodiment, since a plurality of flexible LED light strips 3 are provided and respectively received in the limiting passages 13. In view of this, by denoting the first flexible LED light strip 3 as A, the second flexible LED light as B and so forth, multiple groups of flexible LED light strips are formed. A control chip of the control system 2 respectively controls these groups A, B, C . . . to conduct color change, switching and other actions. On this basis, because each of the flexible LED light strips 3 includes a light strip body 32 and a plurality of LED lamp beads 33 arranged at intervals on the light strip body 32, a control address is set for each group of LED light beads. For example: If there are n LED lamp beads in group A, the corresponding control addresses are a1, a2, a3 . . . an;

if there are n LED lamp beads in group B, the corresponding control addresses are b1, b2, b3 . . . bn;

if there are n LED lamp beads in group C, the corresponding control addresses are c1, c2, c3 . . . cn;

and so on, thus forming a matrix graph.

n used above is an uncertain value, which may be increased or decreased according to the guidance of the present disclosure.

To display a corresponding pattern, the control system 2 firstly enables the pattern to correspond to the matrix pattern to obtain control addresses corresponding to the pattern, and then turns on the LED beads with the corresponding control addresses and turns off the LED beads with other non-corresponding control addresses, thus obtaining the presented pattern.

The present disclosure improves a conventional curtain structure, and combines the conventional curtain with the flexible LED light strips 3 to form a combined curtain with interactive display. In this way, the function of the curtain is no longer limited to sunshade and heat insulation, and the curtain also has a decorative function and may form preset patterns by controlling the light strips as needed.

As an embodiment, a mounting portion 14 is also provided at the top of the curtain body 1; the mounting portion 14 is provided with a main telecommunication line 31, each of the flexible LED light strips 3 has an end electrically connected to the main telecommunication line 31, and the main telecommunication line 31 is electrically connected to the control system 2, thus forming a complete electrical circuit. The control system 2 is provided on one side of the curtain body 1.

Optionally, an outer end of the mounting portion 14 is also connected to a fold-over portion 15 covering the main telecommunication line 31. The fold-over portion 15 covers the main telecommunication line 31 and shields electrical connection structures inside the curtain, thereby enhancing the aesthetics of the entire curtain lighting device. The fold-over portion 15 is also usable for hanging the curtain. The mounting portion 14 and the fold-over portion 15 are both made of non-transparent materials.

The inner or outer side of the fold-over portion 15 is coated with at least one glue layer (not shown). In order not to affect the use and appearance, it is preferred to provide the glue layer on the surface at the inner side. On the one hand, the glue layer may function as an insulating layer, and on the other hand, the glue layer may prevent rainwater or the like from entering the inner side through the fabric. In this way, safety may be further improved, and the waterproof and moisture-proof effects are also achieved.

To fix the fold-over portion 15, a Velcro 16 is provided at an end of the fold-over portion 15, and the mounting portion 14 is provided with a fastening tape 17 used in combination with the Velcro 16. The fold-over portion 15 may be fixed by the Velcro 16, thereby effectively preventing the fold-over portion 15 from being easily uncovered.

Figure 4:
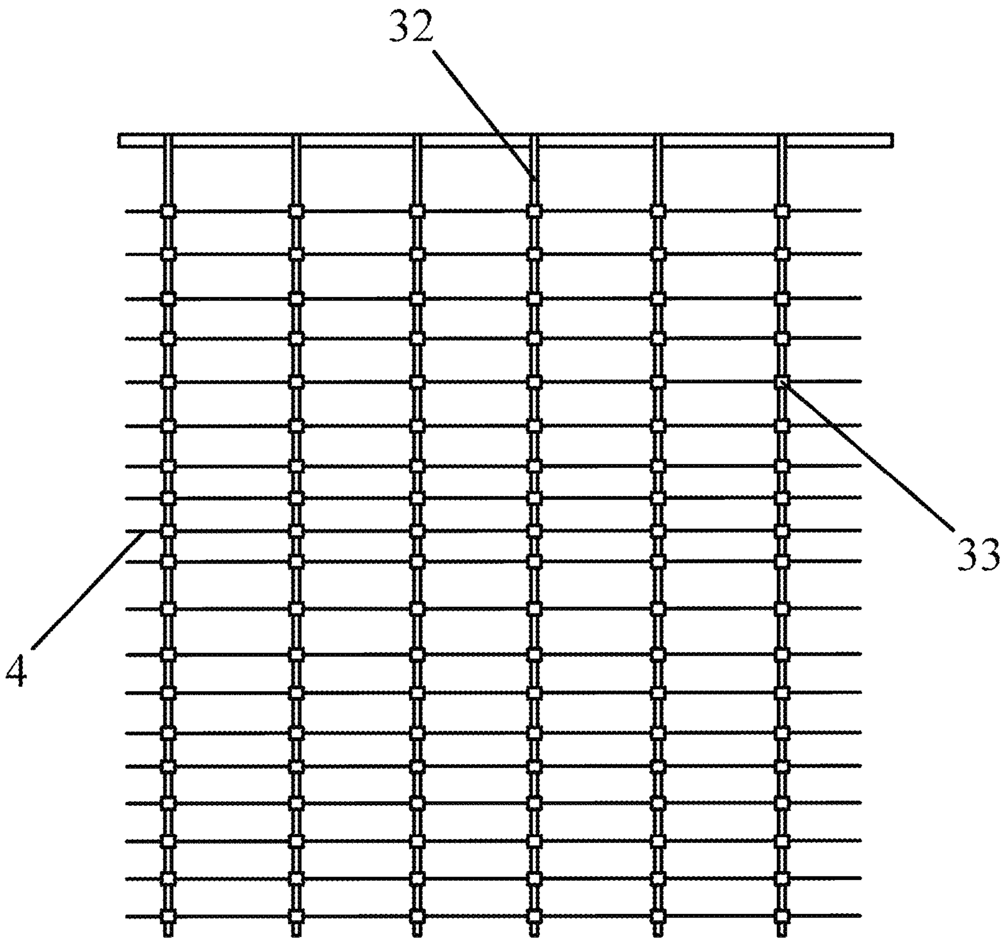
FIG. 4 is a schematic structural diagram of a flexible LED light strip of the present disclosure.

As shown in FIG. 4, the technical solution further includes a plurality of transverse structural lines 4 which connect the plurality of flexible LED light strips 3, and the transverse structural lines 4 and the flexible LED light strips 3 are perpendicular to each other. The above structure may support the overall structure of the flexible light strips embedded in the curtain body 1, and also may fix lamp beads in a horizontal direction.

Optionally, the transverse structural lines 4 are hot melt adhesive lines. The hot melt adhesive lines are shaped quickly and have the advantages of good moisture-proof, waterproof, and anti-oxidation properties, thereby effectively increasing the service life. The most important thing is that the hot melt adhesive lines are flexible and anti-rolling folding, thereby avoiding the impact on the rolling of the fabric curtain to the greatest extent.

As an embodiment, the control system 2 includes a circuit board 21, the circuit board 21 is electrically connected to the main telecommunication line 31, and the circuit board 21 is electrically connected to an electrical connector 22. When the electrical connector 22 is connected to an external power supply, the combined curtain is powered on, and the user may receive signals through the circuit board 21 to adjust the flexible LED light strips 3 to form preset patterns.

Optionally, the circuit board 21 is provided with an electrical slot 23 for placing a memory card. In this way, the curtain does not need to be controlled by software or the like and the curtain may be driven to display the preset patterns after the memory card is directly inserted into the electrical slot 23.

In the present technical solution, the first fabric base layer 11 is also provided with a first fold-over edge 18, a second fold-over edge 19 and a third fold-over edge 20. Each of the flexible LED light strips 3 includes a light strip body 32 and a plurality of LED lamp beads 33 arranged at intervals on the light strip body 32. The LED lamp beads 33 are fixed in the curtain body 1 by the transverse structural lines 4. To further position the LED lamp beads 33, the LED lamp beads 33 may also be positioned in the limiting passages 13 by dispensing glue.

In this embodiment, the fabric curtain is usually about 2.5 meters high, so the corresponding limiting passages 13 are also long. In order to arrange the flexible LED strips 3 in the formed limiting passages 13 smoothly, a sleeve 5 is connected to an entering end of the body of each flexible LED light strip 3, and a guide rope 6 is provided in the sleeve 5, and then a guide needle is used to catch the guide rope 6 to guide the flexible LED light strip 3 into the corresponding limiting passage 13. Finally, the guide rope 6 is fixed to the end of the limiting passage 13. When the guide rope 6 is fixed, the guide rope 6 may be fixed by sewing, or the guide rope 6 may be fixed by means of external glue dispensing (FIG. 5).

Optionally, a hook is provided at a connection position between the fold-over portion 15 and the mounting portion 14 for hanging the curtain body 1 up.

As an embodiment, a clamping member is connected to the bottom of the hook, and the hook is detachably connected to the mounting portion 14 or the fold-over portion 15 by the clamping member. In this way, the location of the hook may be adjusted at any time as needed.

The above contents are only preferred embodiments of the present disclosure. For those of ordinary skill in the art, according to the concept of the present disclosure, modifications may be made to the specific embodiments and the application scope. The contents of this specification should not be understood as limiting the present disclosure.

What is claimed is:

1. A combined fabric curtain with interactive display, comprising a curtain body (1), comprising a control system (2) and a plurality of flexible LED light strips (3), wherein:

the curtain body (1) comprises a first fabric base layer (11) and a second fabric covering layer (12), the first fabric base layer (11) and the second fabric covering layer (12) are both light-transmitting fabrics, the first fabric base layer (11) and the second fabric covering layer (12) overlap each other, and the first fabric base layer (11) and the second fabric covering layer (12) are spaced apart to form limiting passages (13) for receiving the flexible LED light strips (3);

the flexible LED light strips (3) are fixedly installed in the limiting passages (13) and are electrically connected to the control system (2), each of the LED light strips including a plurality of LED lamp beads;

the control system (2) controls the plurality of flexible LED light strips (3) to interact and cooperate with each other to emit light to form preset patterns;

a sleeve (5) is connected to an entering end of a body of each flexible LED light strip (3), a guide needle is attached to the guide rope (6) to guide the flexible LED light strip (3) into a corresponding one of the limiting passages (13); and a plurality of transverse structural lines (4) which connect the plurality of flexible LED light strips, wherein the transverse structural lines (4) and the flexible LED light strips (3) are perpendicular to each other, and the LED lamp beads are aligned with and connected to respective ones of the transverse structural lines.

2. The combined fabric curtain with interactive display according to claim 1, characterized in that, a mounting portion (14) is also provided at a top of the curtain body (1); the mounting portion (14) is provided with a main telecommunication line (31), each of the flexible LED light strips (3) has an end electrically connected to the main telecommunication line (31), and the main telecommunication line (31) is electrically connected to the control system (2).

3. The combined fabric curtain with interactive display according to claim 2, characterized in that, an outer end of the mounting portion (14) is also connected to a fold-over portion (15) covering the main telecommunication line (31), and the mounting portion (14) and the fold-over portion (15) are both made of non-transparent materials.

4. The combined fabric curtain with interactive display according to claim 3, characterized in that, a hook and loop fastener (16) is provided at an end of the fold-over portion (15), and the mounting portion (14) is provided with a fastening tape (17) used in combination with the hook and loop fastener (16).

5. The combined fabric curtain with interactive display according to claim 1, characterized in that, the transverse structural lines (4) are hot melt adhesive lines.

6. The combined fabric curtain with interactive display according to claim 1, characterized in that, the control system (2) comprises a circuit board (21), the circuit board (21) is electrically connected to a main telecommunication line (31), and the circuit board (21) is electrically connected to an electrical connector (22).

7. The combined fabric curtain with interactive display according to claim 6, characterized in that, the circuit board (21) is provided with an electrical slot (23) for placing a memory card.

8. The combined fabric curtain with interactive display according to claim 1, characterized in that, the first fabric base layer (11) is also provided with a first fold-over edge (18), a second fold-over edge (19) and a third fold-over edge (20); each of the flexible LED light strips (3) comprises a light strip body (32) and the plurality of LED lamp beads (33) arranged at intervals on the light strip body (32).

9. The combined fabric curtain with interactive display according to claim 8, characterized in that, the LED lamp beads (33) may also be positioned in the limiting passages (13) by dispensing glue.

* * * * *